United States Patent

Watanabe et al.

[11] Patent Number: 5,728,485
[45] Date of Patent: Mar. 17, 1998

[54] ELECTRODE FOR POLYMER ELECTROLYTE ELECTROCHEMICAL CELL AND PROCESS OF PREPARING SAME

[75] Inventors: Masahiro Watanabe, Yamanashi; Koichi Sakairi, Kanagawa, both of Japan

[73] Assignees: Tanaka Kikinzoku Kogyo K.K.; Masahiro Watanabe, both of Japan; Stonehart Associates, Inc., Madison, Conn.

[21] Appl. No.: 873,760

[22] Filed: Jun. 12, 1997

Related U.S. Application Data

[63] Continuation of Ser. No. 404,502, Mar. 15, 1995, abandoned.

[51] Int. Cl.$^6$ ................................................ H01M 4/86
[52] U.S. Cl. ........................ 429/41; 429/40; 204/282; 204/283; 204/290 R
[58] Field of Search ............... 429/41.42; 204/282, 204/283, 290 R

[56] References Cited

U.S. PATENT DOCUMENTS

| | | | |
|---|---|---|---|
| 4,399,009 | 8/1983 | Chisholm | 204/283 |
| 4,931,168 | 6/1990 | Watanabe et al. | 429/42 |
| 5,203,978 | 4/1993 | Tsou et al. | 204/283 |
| 5,242,764 | 9/1993 | Dhar | 429/42 |

*Primary Examiner*—Bruce F. Bell
*Attorney, Agent, or Firm*—Klauber & Jackson

[57] ABSTRACT

Disclosed an electrode for a polymer electrolyte electrochemical cell which comprises catalyst supports carrying catalyst particles, a first solid polymer electrolyte layer insoluble in water and an organic solvent formed on the particles and a second solid polymer electrolyte layer insoluble or soluble in the organic solvent formed on part of the surface of the first solid polymer electrolyte layer and a process of preparing same.

3 Claims, 3 Drawing Sheets

UNIFORM COATING OF INSOLUBILIZED SOLID POLYMER ELECTROLYTE 5,728,485

ELECTRODE FOR POLYMER ELECTROLYTE ELECTROCHEMICAL CELL AND PROCESS OF PREPARING SAME

This application is a continuation of application Ser. No. 08/404,502, filed Mar. 15, 1995, now abandoned.

BACKGROUND OF THE INVENTION

The present invention relates to an electrode for a polymer electrolyte electrochemical cell having catalyst particles coated with a sufficient amount of a solid polymer electrolyte uniformly dispersed.

A solid polymer electrolyte fuel cell is attracting attention as an electric source of an electric automobile and a space craft because it is compact and can take out a higher current density than a phosphoric acid fuel cell. In the development of this field, various electrode structures, processes of preparing catalysts and system constructions have been proposed. FIG. 1 schematically shows a principle and a construction of the solid polymer electrolyte fuel cell in which an anode side gas diffusion electrode 4A consisting of an anode side porous catalyst layer 2A and an anode side electroconductive porous support layer 3A bonded to each other is bonded to one surface of an ion exchange membrane 1 while a cathode side gas diffusion electrode 4C consisting of a cathode side porous catalyst layer 2C and a cathode side electroconductive porous support layer 3C bonded to each other is bonded to the other surface of the ion exchange membrane 1. To the anode side gas diffusion electrode 4A, there is contacted a separator 6A having reaction gas supply channels 5A among which a current collecting portion 7A is formed. Similarly, to the cathode side gas diffusion electrode 4C, there is contacted a separator 6C having reaction gas supply channels 5C among which a current collecting portion 7C is formed. The both gas diffusion electrodes 4A, 4C are connected with a conducting wire having a load 8, and hydrogen and oxygen are supplied to the anode side and the cathode side, respectively, so that an electric power can be taken out through the load 8.

The present inventors have proposed a process of preparing an electrode equipped with a current collector which comprises dipping supports carrying catalyst particles in an ion exchange resin dispersed solution Nafion (trademark) solution functioning as a solid polymer electrolyte to coat the surface of the supports with the solid polymer electrolyte to prepare electrode particles having the catalyst particles redispersing the particles in a solvent, transferring the particles on carbon paper or the like functioning as a current collector by filtering and performing the integration by means of hotpressing. Since the electrode particles penetrate into the interior of the current collector when the said electrode is employed as that for a fuel cell, the distance from the surface of the current collector to the electrode particles a reaction must move is advantageously reduced so that the flow-in of the reaction gas and the flow-out of water vapor can be smoothly conducted.

However, in spite of the above advantages, the electrode has the following drawbacks. ① When the electrode particles coated with the solid polymer electrolyte are redispersed in the solvent, a part of the solid polymer electrolyte dissolves into the solvent to decrease the amount of the electrolyte so as to result in the incomplete contact with the catalyst and the decrease of ionic conductivity. ② If a surplus amount of the electrolyte is coated in view of the dissolution thereof, the drawback of ① may be overcome, but electrode properties may be deteriorated because of the lowering of diffusability of the reaction gas to the catalyst. ③ The uniform solid polymer electrolyte coating is difficult to be formed by means of the above mentioned only one dipping into the Nafion solution so that the electrode characteristics cannot be elevated.

A catalyst layer prepared according to the conventional technique is schematically shown in FIG. 2. Since solid polymer electrolyte layers 11 are formed on catalyst supports 10 carrying catalyst particles 9 by means of only one coating operation. In the above process, an excess and an deficiency of an amount of the solid polymer electrolyte or an excessive coating portion and an deficient coating portion are formed so as to disable to elevate the electrode characteristics.

Further, as the support of the electrocatalyst, carbon particles are employed which are mixed with ion exchange resin and bonded by means of hotpressing or the like to form an electrocatalyst layer. Since the particles of the electrocatalyst layer thus prepared are compactly filled and firmly adhered to one another by means of the hotpressing, the number of gas flowing paths is small so that a feed gas is difficult to diffuse through the electrocatalyst layer and to reach a reaction point and further the discharge of a gas formed cannot be smoothly carried out.

Accordingly, the supply of the feed gas is made to be more difficult so as to lower the reaction efficiency at the electrocatalyst layer and only a small area of energy having a value considerably lower than the theoretical maximum output value may be disadvantageously obtained.

SUMMARY OF THE INVENTION

It is an object of the present invention to provide an electrode for a polymer electrolyte electrochemical cell which has the capability of maintaining high bonding strength among electrocatalyst support particles and suppressing the dissolution of a solid polymer electrolyte coated on the particles.

It is another object of the present invention to provide a process of preparing the above electrode.

It is a further object of the present invention to provide another electrode for a polymer electrolyte electrochemical cell which enables the smooth gas flow to obtain high output energy by elevating the void volume of an electrocatalyst layer.

One aspect of the present invention for achieving the above object is an electrode for a polymer electrolyte electrochemical cell which comprises catalyst supports carrying catalyst particles, a first solid polymer electrolyte layer insoluble in water and an organic solvent formed on the particles and a second solid polymer electrolyte layer insoluble or soluble in the organic solvent formed on part of the surface of the first solid polymer electrolyte layer.

Another aspect of the present invention is a process of preparing an electrode for a polymer electrolyte electrochemical cell which comprises dipping catalyst supports carrying catalyst particles in a solid polymer electrolyte solution, dispersing the solid polymer electrolyte on the catalyst supports, evaporating the solvent of the said solution to coat the catalyst supports with the solid polymer electrolyte, thermally treating the catalyst supports for insolubilizing the solid polymer electrolyte to a solvent to convert the solid polymer electrolyte into a first solid polymer electrolyte layer, dispersing the catalyst supports having the first solid polymer electrolyte layer in a solid polymer electrolyte solution to form a paste and applying the paste on a substrate to form a second solid polymer electrolyte layer. In this aspect, the second solid polymer electrolyte layer may be formed by applying the material thereof in the form of suspension or powder.

Since, in this electrode for the electrochemical cell, the catalyst supports carrying the catalyst particles is coated with the first solid polymer electrolyte layer, the dissolution of the first solid polymer electrolyte layer coating the catalysts does not at all occur or seldom occur during the formation of the second solid polymer electrolyte layer and the preparation of the electrode for the cell so that the lowering of the contact between the catalysts and the electrolyte and of the utilization of the catalysts can be depressed.

The elevation of the activity is especially remarkable when the weight ratio between the first and the second polymer electrolyte layers of the electrode for the electrochemical cell is from 99:1 in which the second solid polymer electrolyte layers is substantially formed to 60:40.

The above electrode can be prepared employing a paste method, a filter transfer method or a powder spread method. Even if either method is employed, the bonding strength among the catalyst particle flocs weakened by the thermal treatment can be elevated by converting the solid polymer electrolyte soluble in water and an organic solvent into the first solid polymer electrolyte layer insoluble in water and an organic solvent by means of thermally treating the solid polymer electrolyte layer formed on the surface of the catalyst supports and of forming the second solid polymer electrolyte layer soluble in the organic solvent on the first solid polymer electrolyte layer.

Accordingly, in the above electrode for the electrochemical cell prepared by the process, the lowering of the activity due to the lowering of the catalyst utilization is prevented because the contact between the catalysts and the solid polymer electrolyte is secured, and the smooth formation of the electrocatalyst layer on the substrate can be performed because the bonding strength among the solid polymer electrolytes coating the catalyst supports is elevated by the second solid polymer electrolyte layer as well. Moreover, the proton transfer in the electrode is made higher, and the gas permeability is excellent because no superfluous electrolyte is added to unnecessary portions of the electrode.

A further aspect of the present invention is an electrode for a polymer electrolyte electrochemical cell which comprises a porous current collector and an electrocatalyst layer comprising supported catalysts and ion exchange resin supported on the porous current collector characterized in that the catalyst particles and ion exchange resin are supported directly on a plurality of carbon fibers and/or a plurality of granular carbon supports carrying catalyst metal particles are supported with the ion exchange resin on the carbon fibers.

The catalyst of this aspect includes three embodiments. The first embodiment is the catalyst metal particles directly supported on the carbon fibers, the second is the granular supports carrying the catalyst metal particles supported on the carbon fibers and the third is the combination thereof.

Since, in either embodiment, the carbon fibers different from carbon particles provide porosity to the electrocatalyst layer; the supply of the reaction gas to the electrocatalyst layer and the discharge of the produced gas from the electrocatalyst layer are smoothly conducted. Accordingly, the reaction gas is smoothly reacted to take out a high output and to attain a high current density so that the electrode for the polymer electrolyte electrochemical cell having the high performance can be provided.

Especially in the high current density range in which the effective introduction of the reaction gas to the catalyst surface by effectively discharging a large amount of water produced in this range is required, when the existing density of the catalyst metal particles in the direction of the thickness of the electrocatalyst layer increases with the approach to the solid polymer electrolyte membrane, the discharge of the water can be performed more effectively.

When the amount of apertures having a size between $10^3$ to $10^5$Å existing in the electrocatalyst layer is made to be between 0.2 and 1.0 cc/g, the apertures for the gas supply and discharge are sufficiently secured, and the network of the ion exchange resin for promoting the reaction is maintained so that the movement of the proton may be smoothly conducted.

DETAILED DESCRIPTION OF THE INVENTION

Figure 1:
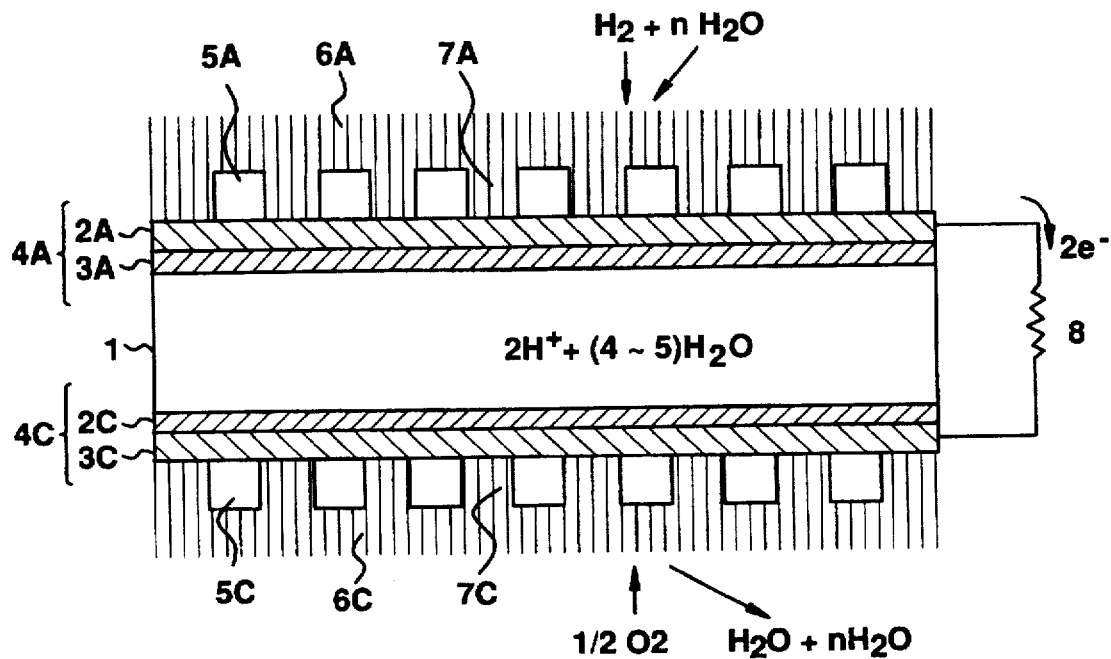
FIG. 1 is a schematic view showing a principle and a construction of a solid polymer electrolyte fuel cell.
Figure 2:
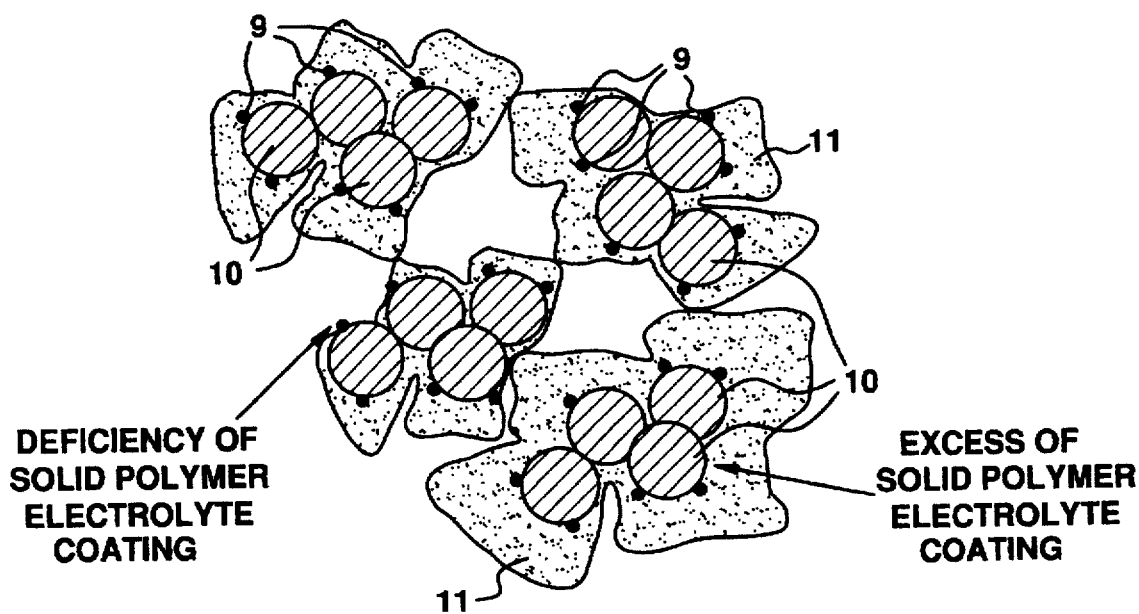
FIG. 2 is a schematic view showing a catalyst layer of an electrode of a conventional fuel cell.

As mentioned, in the process of preparing the electrode for the electrochemical cell, the solid polymer electrolyte is coated on the support catalysts in two separate steps. Most of the coating of the solid polymer electrolyte will occur in the first coating step. The coating formation is conducted by dipping the support catalysts in the solid polymer electrolyte solution under preferably strong agitation to deposit the solid polymer electrolyte on the support catalysts, drying them to remove the solvent and thermally treating the support catalysts at a temperature between 100° and 180° C. to form the first solid polymer electrolyte layer; the electrolyte of which is insolubilized in almost all the solvents. The raw material for the second solid polymer electrolyte layer may be prepared by dispersing the catalysts coated with the electrolyte in the solid polymer electrolyte solution.

The solid polymer electrolyte employed in the present invention includes a polymer compound having an ionic conductivity and a resistance to an electrolyte and a reaction gas employed in such an electrochemical cell as a phosphoric acid fuel cell, in generally, fluorine resin having a carboxylic acid group or a sulphonic acid group, for example, the above mentioned Nafion.

The amount of the solid polymer electrolyte is such that the support catalysts are completely coated with the said electrolyte, and the ratio of the first coating is desirably more than about 60% to the total amount of the solid polymer electrolyte of the first and second coatings. During or soon after first coating, the thermal treatment at a temperature between 100° and 180° C. preferably in an inert gas is conducted for converting the solid polymer electrolyte into that insoluble in water and an organic solvent, and the catalyst supports are coated with a relatively large amount of said solid polymer electrolyte. This thermal treatment step enables the solid polymer electrolyte coated on the surface of the catalyst supports to be insolubilized when it is in contact with water and an organic solvent in the succeeding treatment steps. The crystallization of the solid polymer electrolyte is promoted in the above thermal treatment step resulting in the insolubilization in the solvent. Thermal treatment temperature over 180° C. is undesirable because thermal decomposition may occur. Under the temperature of 100° C., the insolubilization effect may not be obtained.

Then, the second coating of the solid polymer electrolyte on the support catalysts thermally treated and coated with the solid polymer electrolyte is conducted. The second coating is carried out for strengthening the bonding among the flocs of the catalyst supports weakened by the thermal treatment of the first coating step. Accordingly, the second coating facilitates the formation of an electrode below mentioned to provide the electrode having the high strength and superior characteristics. The second coating is conducted by dispersing the powdery support catalyst having been subjected to the first coating and the thermal treatment in a solid polymer electrolyte solution the same as or different from that of the first coating. When the amount of the electrolyte solution employed is small, a paste is produced by the dispersion operation which contains the solvent, and the paste thus obtained is applied to a substrate and dried to obtain the first solid polymer electrolyte layer, or the paste is dried at a temperature below 100° C. to obtain the second solid polymer electrolyte layer. The catalyst particles may be redispersed in a liquid which is employed as a suspension liquid for preparing an electrode by means of a filtration transfer method.

The second solid polymer electrolyte layer may be thermally treated to be insolubilized provided that the bonding of the catalyst supports in the first solid polymer electrolyte layer is not weakened.

When the paste is obtained, after the paste is applied to the surface of a substrate functioning as a current collector or a simple current collector by means of a blade method, a bar-code method, a screen print method, a transfer rolling method, a spray method or the like and dried for removing the solvent, the paste is conventionally integrated with the substrate by means of hot pressing to form an electrode for an electrochemical cell having an electrocatalyst layer on the substrate.

When the suspenison liquid is obtained, the electrode may be prepared by transferring the suspension on the substrate by means of the above conventional filtrate transfer method.

Since the thus obtained electrode for the electrochemical cell according to the present invention has been thermally treated during the first coating step, the solid polymer electrolyte firmly adheres to the catalyst supports and is insolubilized so that the dissolution of the solid polymer electrolyte adhered on the catalyst supports does not at all occur or seldom occurs during the dispersion procedure of the catalyst supports in the the solid polymer electrolyte solution at the time of the second coating. Since, further, the bonding strength among the catalyst support flocs weakened by the thermal treatment is strengthened by the second coating of the solid polymer electrolyte, the electrode with the sufficient strength can be obtained. Since the flocs are densely bonded, the network having the high proton conductivity may be formed. Since the uniform and thin solid polymer electrolyte layer is formed when a smaller amount of the solid polymer electrolyte is employed in the second coating operation than in the first coating operation, the electrode with improved permeability can be prepared compared with that of which all the coatings are formed at once.

Figure 3:
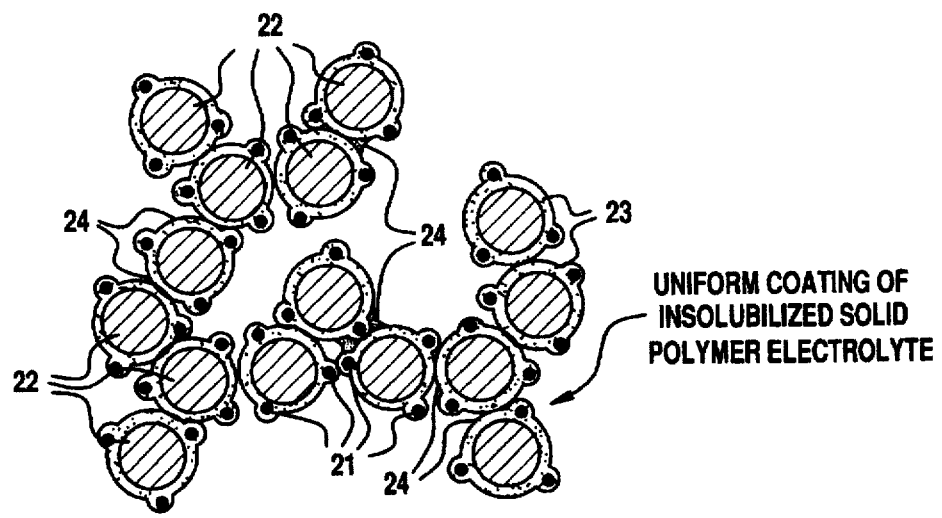
FIG. 3 is a schematic view exemplifying a catalyst layer of a solid polymer electrolyte electrochemical cell according to the present invention.

In FIG. 3, first solid polymer electrolyte layers 23 are formed on a plurality of catalyst supports 22 carrying catalyst particles 21, and on only small portions at the bonding between the two adjacent catalyst supports 22, there are formed second solid polymer electrolyte layers or portions 24.

The second solid polymer electrolyte layer 24 restores the bonding strength among the respective catalyst supports 22 weakened during the thermal treatment of the first solid polymer electrolyte layer 23 to provide an electrode having the sufficient strength.

In the third aspect of the present invention, carbon fibers especially carbon short fibers are employed as a support carrying the catalyst metal particles. Since the carbon fibers provide porosity when they are employed as a support different from a carbon particle, the supply of the reaction gas to the electrocatalyst layer and the discharge of the produced rate of gas from the electrocatalyst layer can be smoothly attained. The gas diffusion in the electrode in the high current density range is rate-determining, and the amount of water produced is large especially at a cathode in the high current density range which is required to be effectively discharged for effectively introducing an oxygen gas to the catalyst surface. This is achieved by the present invention. Similarly, the present invention has the capability of permitting withdrawal of a high output by promoting the gas supply and discharge also at the low current density range. Especially, in order to maintain the high voltage in the low current density range, the existing density of the catalyst metal particles in the sectional direction of the electrocatalyst layer of the electrode is effectively made to be increased with the approach to a solid polymer electrolyte membrane when the cell is constituted employing the electrode with the solid polymer electrolyte membrane.

The electrode of this aspect, as mentioned earlier, includes the three embodiments. The first embodiment is the catalyst metal particles directly supported on the carbon filters, the second is the granular supports carrying the catalyst metal particles supported on the carbon fibers and the third is the combination thereof. In either embodiment, a sufficient space is formed in the electrocatalyst layer to smoothly perform the gas supply and discharge.

As the carbon fibers of the present invention, commercially available carbon fibers may be employed without modifications of which a diameter is preferably between 0.1 and 10 μm and of which a length is preferably between 100 and 1000Å.

As the catalyst metal particles of the electrode of the present invention, such a precious metal as platinum, palladium and ruthenium may be employed. As the ion exchange resin, perfluorocarbon sulphonic acid or the like may be employed.

When the granular supports are employed, the supports are preferably carbon supports of which a diameter is between 100 and 1000Å. The porous current collector employed is preferably carbon paper or carbon cloth hydrophobically treated.

When the catalyst metal particles are directly supported on the carbon fibers, after carbon fibers are dipped in an aqueous solution of a compound of the catalyst metal, for example, chloroplatinic acid or palladium chloride, a reduction treatment or thermal decomposition may be carried out to support the catalyst metal particles. The particle size of the catalyst metal particle and the density thereof on the carbon fibers can be determined by suitably establishing the concentration of the aqueous solution, the reduction and thermal decomposition conditions and the specific surface area of the support. The electrocatalyst layer forming raw material is prepared by intertwining the carbon fibers with the ion exchange resin for example Nafion.

When the catalyst metal particles are supported on the granular supports, the above reduction and thermal decomposition operations may be conducted replacing the carbon fibers with the granular support. The electrocatalyst layer formed raw material is prepared by intertwining these granular supports carrying the catalyst metal particles with the ion exchange resin and supporting the supports on the carbon fibers.

When the catalyst metal particles directly supported on the carbon fibers are employed with the granular supports carrying the catalyst metal particles supported on the carbon fibers, the granular supports carrying the catalyst metal particles prepared according to the operations previously mentioned are intertwined by means of the ion exchange resin with the carbon fibers on which the catalyst metal particles is already supported.

In order to form the electrocatalyst layer employing the electrocatalyst layer forming raw material thus prepared, either of a wet process such as a filtration transferring method and a paste printing method and a dry method such as a screen method employing a screen and suction may be conducted.

It is desirable to form the apertures in the electrocatalyst layer of the electrode thus prepared such that the volume of the apertures of which a size is between $10^3$ and $10^5$Å is between 0.2 and 1.0 cc/g. When the aperture volume is below 0.2 cc/g, the number of the apertures for the supply of the reaction gas (oxygen gas) and the discharge of the produced gas (water vapor) decreases to lower the electrode performance in the high current density range in which gas diffusion is rate-determining. When the aperture volume is over 1.0 cc/g, the movement of the proton which flows in the exchange resin is rate-determining to depress the progress of the reaction.

Figure 4:
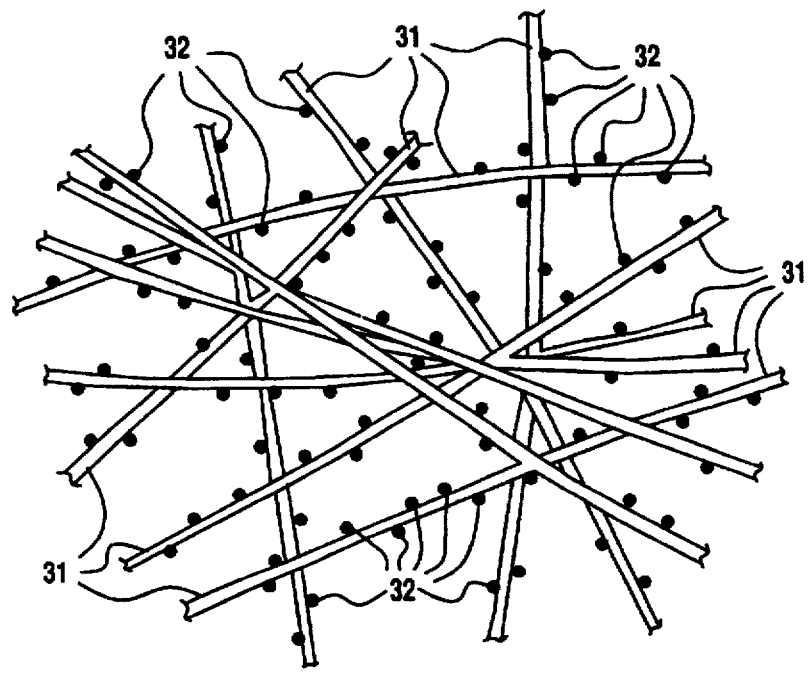
FIG. 4 is an enlarged view showing a first embodiment of material of preparing a solid polymer electrolyte electrochemical cell of the present invention.
Figure 5:
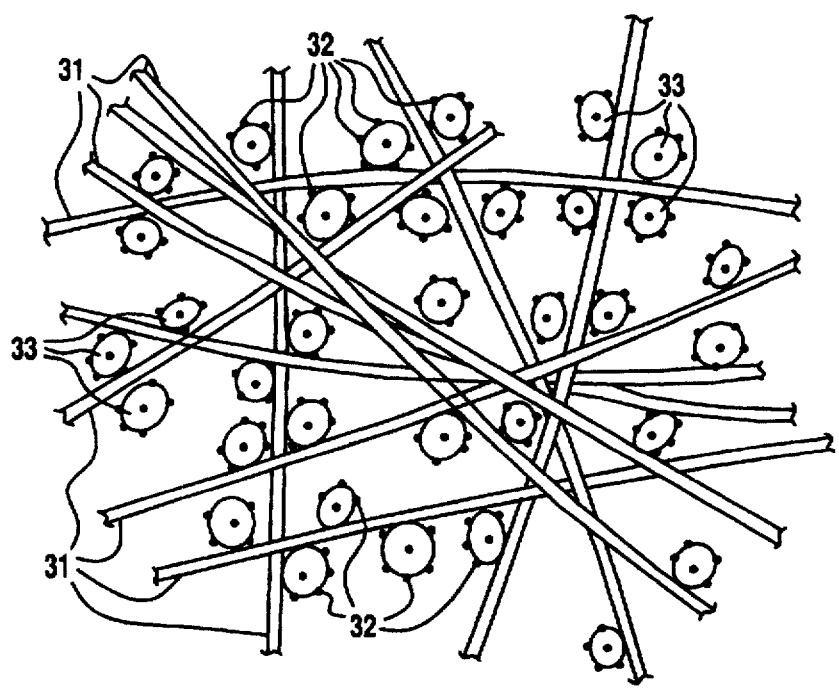
FIG. 5 is an enlarged view showing a second embodiment thereof.
Figure 6:
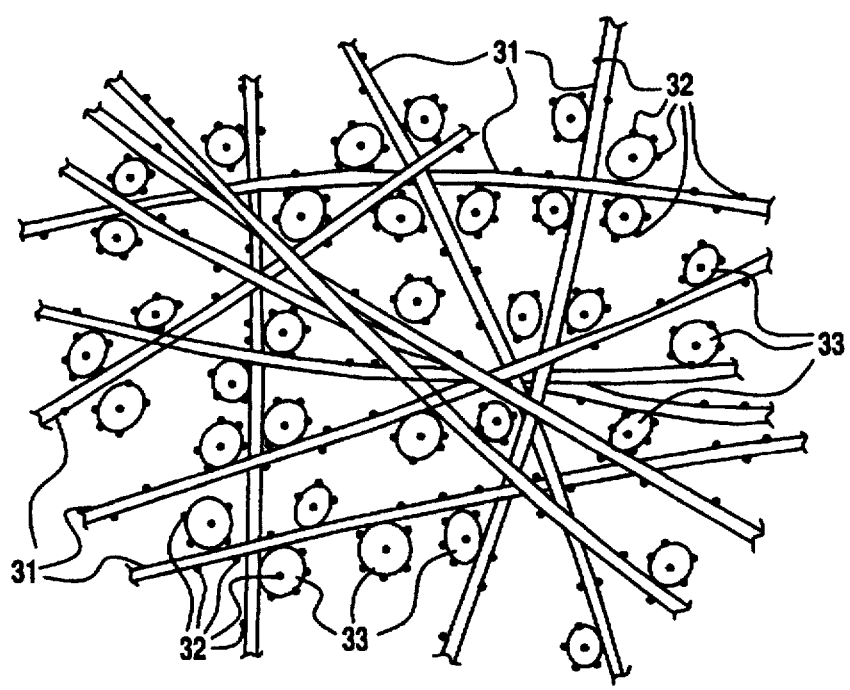
FIG. 6 is an enlarged view showing a third embodiment thereof.

FIGS. 4 to 6 show the respective embodiments exemplifying a minute structure of an electrode of a solid polymer electrolyte electrochemical cell according to the present invention.

In FIG. 4, a number of carbon short fibers 31 are intertwined with one another to constitute a network and a number of catalyst metal particles 32 are supported on each of the carbon short fibers. Ion exchange resin (not shown) such as Nafion is intertwined with this network to prepare electrocatalyst layer raw material.

FIG. 5 shows another embodiment in which the catalyst metal particles are not directly supported on the carbon fibers as shown in FIG. 4 but supported on granular supports 33 which are then supported on the carbon fibers 31. Also in FIG. 5, ion exchange resin (not shown) such as Nafion is intertwined with this network to prepare electrocatalyst layer raw material.

FIG. 6 shows a further embodiment in which both of catalyst metal particles 32 directly supported on carbon fibers 31 and granular supports 33 carrying catalyst metal particles 32 are employed.

EXAMPLE

Examples of the electrode of the present invention and its preparation will be described. However, the present invention is not restricted by these Examples.

Example 1

After carbon powder was dipped in a chloroplatinic acid solution (platinum concentration: 5 g/liter), it was subjected to a thermal decomposition treatment to prepare a platinum-carbon catalyst of which a platinum loading was 30% in weight. After the carbon catalyst was dipped in a commercially available ion exchange dispersion solution (Nafion solution), dispersed employing an ultrasonic homogenizer and dried at 80° C. for removing the solvent to prepare a powdery support catalyst having an ion exchange resin (solid polymer electrolyte) layer on its surface, the support catalyst was thermally treated at 140° C. in a nitrogen atmosphere for one hour to make an insolubilized first solid polymer electrolyte layer coating. The amount of the Nafion solution was adjusted so that the weight ration between the Nafion and the carbon powder was made to be 1:1 including a second addition of Nafion which will be described later.

Then, the thus prepared Nafion supported catalyst was divided into four equal portions. The respective portions were separately dispersed in four Nafion solutions in ball mills having the respective Nafion amount ratios to those coated in the preceding step of ① 99.5:0.5, ② 85:15, ③ 70:30 and ④ 55:45 to form to prepare four pastes. After the paste was developed on carbon paper hydrophobically treated with polytetrafluoroethylene (PTFE), an electrocatalyst layer of which a platinum loading was 1 mg/cm² was formed with a blade employing the paste. After the carbon paper was dried at first at a room temperature and then at 80° C. to remove the solvent to form a second solid polymer electrolyte layer, it was hot pressed at 25 kg/cm² and 130° C. to prepare an electrode for a fuel cell.

Comparative Example 1

After carbon powder was dipped in a chloroplatinic acid solution (platinum concentration: 5 g/liter), it was subjected to a thermal decomposition treatment to prepare a platinum-carbon catalyst of which a platinum loading was 30% in weight. The carbon catalyst was dipped in a commercially available ion exchange dispersion solution (Nafion solution), dispersed under agitation and dried at 80° C. to form an ion exchange resin layer on its surface. The weight ratio between the Nafion and the carbon powder was 1:1. The catalyst support was fractionated so as to have the average platinum loading of 1 mg/cm² which was then dispersed in ethanol.

After the dispersion solution was then filtered on filter paper under weak suction to deposit the catalyst support leaving a small amount of the ethanol thereon, the filter paper together with carbon paper having a thickness of 350 μm functioning as a current collector hydrophobically treated was transferred by means of cold pressing at a pressure of 25 kg/cm². Then, it was hot pressed at 130° C. and 25 kg/cm² to prepare an electrode equipped with the current collector. The weight ratio between the Nafion and the carbon at this stage was 39:61 and a considerable part of the Nafion had been dissolved out.

Employing the electrodes of Example 1 and Comparative Example 1 as an anode and a cathode of a fuel cell, the characteristics of the both fuel cells were measured and evaluated under the following conditions and evaluated. That is, supply gases to the anode and the cathode were hydrogen and oxygen at 1 atm., respectively, and mass activities (A/g) at 0.9 V Tafel slopes (mV/decade) and IR free current densities (mA/cm²) at 0.7 V of the both fuel cells were measured. The results are shown in Table 1. The electrode ① of Example 1 in which the coating amount of the solid polymer electrolyte was too small could not form a fuel cell because the electrocatalyst layer was peeled off in the form of powder.

TABLE 1

|  | Example 1 | | | | Comparative Example 1 |
| --- | --- | --- | --- | --- | --- |
|  | ① | ② | ③ | ④ | |
| Mass Activity (A/g) | — | 32 | 32 | 27 | 26.4 |
| Tafel Slope (mV/decade) | — | 61 | 61 | 68 | 71 |
| Current Density (mA/cm$^2$) | — | 1750 | 1800 | 1290 | 1280 |

It is apparent from Table 1 that the electrode having more excellent activities than those of a conventional electrode prepared by means of the filtration transferring method was obtained in a range that the second solid polymer electrolyte layer was substantially formed (the weight of the second solid polymer electrolyte layer was more than 1%), and especially the elevation of the activities was remarkable when the weight of the second solid polymer electrolyte layer was less than 40%.

Example 2

After the catalyst support coated with the first solid polymer electrolyte layer obtained by the thermal treatment at 140° C. for one hour in Example 1 was dispersed in a Nafion solution and dried at 90° C. to form a second solid polymer electrolyte layer coated on the particle surface, suspension liquid prepared by redispersing the support by means of an ultrasonic homogenizer was filtered on filter paper under weak suction to deposit the catalyst support leaving a small amount of the solvent thereon; the filter paper together with carbon paper having a thickness of 350 μm functioning as a current collector hydrophobically treated was transferred by means of cold pressing at a pressure of 25 kg/cm$^2$. Then, it was hot pressed at 130° C. and 25 kg/cm$^2$ to prepare an electrode equipped with the current collector. The weight ratio between the first and the second solid polymer electrolyte layers was 70:30.

After the electrode was incorporated into a fuel cell in accordance with the preceding procedures, a mass activity, a Tafel slope and an IR free current density at 0.7 V were measured to be 31Å/g, 61 mV/decade and 1700Å/cm$^2$, respectively.

Example 3

After carbon fibers (surface area: 1750 m$^2$/g) of which an average diameter was 1 μm were dipped in a chloroplatinic acid solution (platinum concentration: 5 g/liter), they were reduced to support 30% in weight of the platinum and intertwined with a Nafion solution having a solid content of 20 weight % to the weight of the carbon fibers which was then dispersed employing an ultrasonic homogenizer. Then, the solution was filtered and transferred to carbon paper hydrophobically treated with a Teflon (trademark for polytetrafluoroethylene) solution to constitute an electrode by combining by hot pressing at 130° C. A cell of this Example having a sandwich structure employing the electrodes as a cathode and an anode, and an ion exchange membrane (Nafion) inserted therebetween was constituted.

Comparative Example 2

After carbon powder having a surface area of 300 m$^2$/g was dipped in a chloroplatinic acid solution (platinum concentration: 5 g/liter), it was reduced to support 30% in weight of the platinum and dispersed in a Nafion solution having a solid content of 50 weight % to the weight of the carbon particles employing an ultrasonic homogenizer, and dried. The carbon particles intertwined with the Nafion was by means of an ultrasonic homogenizer redispersed in ethanol which was filtered and transferred to carbon paper hydrophobically treated and hot pressed at 130° C. to constitute an electrode. A cell of this Comparative Example having a sandwich structure employing the electrodes as a cathode and an anode, and an ion exchange membrane (Nafion) inserted therebetween was constituted.

Example 4

After carbon short fibers supported with no platinum and the platinum supported carbon particles prepared in Comparative Example 2 were mixed in a carbon ratio of 25:75, a Nafion solution of which a weight was 50% of the total of the carbon short fibers and carbon particles was added and dispersed. The dispersion solution was filtered and transferred to carbon paper hydrophobically treated and hot pressed at 130° C. to constitute an electrode. A cell of this Example having a sandwich structure employing the electrodes as a cathode and an anode, and an ion exchange membrane (Nafion) inserted therebetween was constituted.

Example 5

The same electrode as that of Example 4 except that the platinum supported carbon fibers prepared in Example 3 were employed in place of the carbon short fibers supported with no platinum. A cell of this Example having a sandwich structure employing the electrodes as a cathode and an anode, and an ion exchange membrane (Nafion) inserted therebetween was constituted.

Example 6

In accordance with the procedures of Example 4, the carbon short fibers supported with no platinum and the platinum supported carbon particles were mixed and transferred to carbon paper. After the carbon particles intertwined with the Nafion of Comparative Example 2 were filtered on the carbon paper (the amount of the platinum in the latter filter layer to that in the former mixture was 25%), it was hot pressed at 130° C. to prepare an electrode. A cell of this Example having a sandwich structure employing the electrodes as a cathode and an anode, and an ion exchange membrane (Nafion) inserted therebetween was constituted.

The evaluation of performances of the respective cells of Examples 3 to 6 and Comparative Example 2 was conducted under the following conditions. The results thereof are shown in Table 2.

Platinum loading: 2 mg/cm$^2$

Cell temperature: 80° C.

Temperature for wetting anode gas: 90° C.

Gas pressure: Atmospheric pressure

Gas: Hydrogen and oxygen

TABLE 2

|  | Current Density (mA/cm$^2$) | | | Volume of Pores Between 103 and 105 Å (g/cc) |
| --- | --- | --- | --- | --- |
|  | 0.9 V | 0.7 V | 0.5 V | |
| Example 3 | 22 | 1220 | 2100 | 0.7 |
| 4 | 34 | 1750 | 2800 | 0.4 |
| 5 | 43 | 1730 | 2600 | 0.4 |
| 6 | 50 | 1750 | 2300 | 0.6 |
| Comparative Example 2 | 50 | 1050 | 1500 | 0.1 |

What is claimed is:

1. An electrode for a polymer electrolyte electrochemical cell which comprises:

(a) a support carrying catalyst particles;

(b) a first solid polymer electrolyte layer present on the particles, said first solid polymer electrolyte layer being insoluble in water and an organic solvent; and (c) a second polymer electrolyte layer coated on only a part of a surface of the first solid polymer electrolyte layer, said second polymer electrolyte layer being insoluble or soluble in said organic solvent and further having the effect of elevating the bonding strength among flocs of said support.

2. An electrode for a polymer electrolyte electrochemical cell as claimed in claim 1, containing two first solid polymer electrolyte layers disposed adjacent to one another and a second solid polymer electrolyte layer present in a space between, and in contact with, said two first solid polymer electrolyte layers.

3. An electrode for a polymer electrolyte electrochemical cell as claimed in claim 1, wherein the weight ratio between the first solid polymer electrolyte layer and the second solid polymer electrolyte layer is in the range from 60:40 to 99:1.

* * * * *